(12) United States Patent
Lu et al.

(10) Patent No.: US 8,657,206 B2
(45) Date of Patent: Feb. 25, 2014

(54) TERMINAL BOX FOR CENTRIFUGAL SWITCH OF MOTOR

(75) Inventors: Ping Lu, Zhongshan (CN); Fucheng Chen, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 259 days.

(21) Appl. No.: 12/876,141

(22) Filed: Sep. 5, 2010

(65) Prior Publication Data

US 2011/0211298 A1  Sep. 1, 2011

(30) Foreign Application Priority Data

Feb. 26, 2010 (CN) .......................... 2010 2 0124692

(51) Int. Cl.
*G05D 23/02* (2006.01)
*G05D 23/08* (2006.01)
*G05D 23/12* (2006.01)

(52) U.S. Cl.
USPC ........................................................ 236/93 R

(58) Field of Classification Search
None
See application file for complete search history.

(56) References Cited

U.S. PATENT DOCUMENTS

| | | | | |
|---|---|---|---|---|
| 3,973,729 A | * | 8/1976 | Sliger | 236/34.5 |
| 4,120,274 A | * | 10/1978 | De Lancey | 123/452 |
| 4,179,879 A | * | 12/1979 | Kincaid, Jr. | 60/39.091 |
| 4,508,957 A | * | 4/1985 | Rocchitelli | 392/479 |
| 5,051,731 A | * | 9/1991 | Guim et al. | 340/638 |
| 5,444,424 A | * | 8/1995 | Wong et al. | 335/172 |
| 5,446,431 A | * | 8/1995 | Leach et al. | 335/18 |
| 5,481,235 A | * | 1/1996 | Heise et al. | 335/18 |
| 5,483,211 A | * | 1/1996 | Carrodus et al. | 335/18 |
| 5,607,104 A | * | 3/1997 | Naclerio et al. | 236/34.5 |
| 5,701,110 A | * | 12/1997 | Scheel et al. | 335/132 |
| 5,706,154 A | * | 1/1998 | Seymour | 361/42 |
| 5,818,671 A | * | 10/1998 | Seymour et al. | 361/42 |
| 5,946,179 A | * | 8/1999 | Fleege et al. | 361/42 |
| 6,540,155 B1 | * | 4/2003 | Yahav | 239/70 |
| 6,578,769 B1 | * | 6/2003 | Mathew et al. | 236/34 |
| 6,591,482 B1 | * | 7/2003 | Fleege et al. | 29/605 |
| 6,679,431 B1 | * | 1/2004 | Mathew et al. | 236/34.5 |
| 7,318,403 B1 | * | 1/2008 | Huart et al. | 123/179.28 |
| 2007/0139842 A1 | * | 6/2007 | De'Longhi | 361/103 |
| 2007/0270016 A1 | * | 11/2007 | Boyd et al. | 439/354 |
| 2009/0255282 A1 | * | 10/2009 | Amonett et al. | 62/137 |
| 2013/0125856 A1 | * | 5/2013 | Itakura | 123/198 R |

* cited by examiner

*Primary Examiner* — Jinhee Lee
*Assistant Examiner* — Xanthia C Cunningham
(74) *Attorney, Agent, or Firm* — Matthias Scholl P.C.; Matthias Scholl

(57) ABSTRACT

A terminal box for a centrifugal switch of a motor, having at least a housing, a movable control rod extending from the housing, a cavity disposed on end surface of the housing, and a thermostat disposed in the cavity. A protruding block is disposed on the inner wall of the cavity. A reversed hook is disposed on outer side wall of the thermostat. The bottom of the protruding block abuts against the top of the reversed hook whereby fixing the thermostat in the cavity. The invention effectively simplifies the installation structure of the thermostat and the cavity; the overall installation structure is simple and stable, the cost of the structure is low, and structure of electrical connection in the terminal box is simple and reliable.

7 Claims, 5 Drawing Sheets

TERMINAL BOX FOR CENTRIFUGAL SWITCH OF MOTOR

CROSS-REFERENCE TO RELATED APPLICATIONS

Pursuant to 35 U.S.C. §119 and the Paris Convention Treaty, this application claims the benefit of Chinese Patent Application No. 201020124692.8 filed on Feb. 26, 2010, the contents of which are incorporated herein by reference.

BACKGROUND OF THE INVENTION

1. Field of the Invention

The invention relates to a terminal box for a centrifugal switch of a motor.

2. Description of the Related Art

A conventional centrifugal switch of a motor comprises a terminal box and a centrifugal actuator. The terminal box is contacted with the centrifugal actuator via a movable control rod on side wall thereof, and a cavity operating to receive a thermostat is disposed in the terminal box. However, since the installation structure of the thermostat and the cavity is complex, cost spent on mould opening is very high, which makes it impossible to reduce the overall cost of the centrifugal switch.

SUMMARY OF THE INVENTION

In view of the above-described problem, it is one objective of the invention to provide a terminal box for a centrifugal switch of a motor that is capable of addressing the above-mentioned problems, and features simple installation of a thermostat and a cavity, stable installation structure, and low structure cost.

To achieve the above objectives, in accordance with one embodiment of the invention, provided is a terminal box for a centrifugal switch of a motor, comprising a housing, a movable control rod, a cavity having a protruding block, and a thermostat having a reversed hook. The movable control rod extends from the housing, the cavity is disposed on end surface of the housing, the thermostat is disposed in the cavity, the protruding block is disposed on inner wall of the cavity, the reversed hook is disposed on outer side wall of the thermostat, and the bottom of the protruding block abuts against the top of the reversed hook whereby fixing the thermostat in the cavity.

In a class of this embodiment, a first movable control plate spring, a second movable control plate spring, and multiple connecting terminals are disposed in the housing.

In a class of this embodiment, the first movable control plate spring and the second movable control plate spring are electrically connected to parts of the connecting terminals.

In a class of this embodiment, each of the first movable control plate spring and the second movable control plate spring has a fixed end and a free end.

In a class of this embodiment, multiple springs are disposed in the housing and in the vicinity of the movable control rod, and as the movable control rode moves under the action of external force, the springs elastically supports the movable control rod, and the free end of the first movable control plate spring and the free end of the second movable control plate spring respectively bears pushing force from a first pressing part and a second pressing part on the movable control rod and elastically moves, and electric connection states of the first movable control plate spring and the second movable control plate spring change.

In a class of this embodiment, wall of the cavity and the housing are integrally formed.

Advantages of the invention comprise: 1) installation structure of the thermostat and the cavity is effectively simplified, overall installation structure is simple and stable, and structure cost is low; 2) structure of electric connection in the terminal box is simple and reliable.

DETAILED DESCRIPTION OF THE EMBODIMENTS

Figure 1:
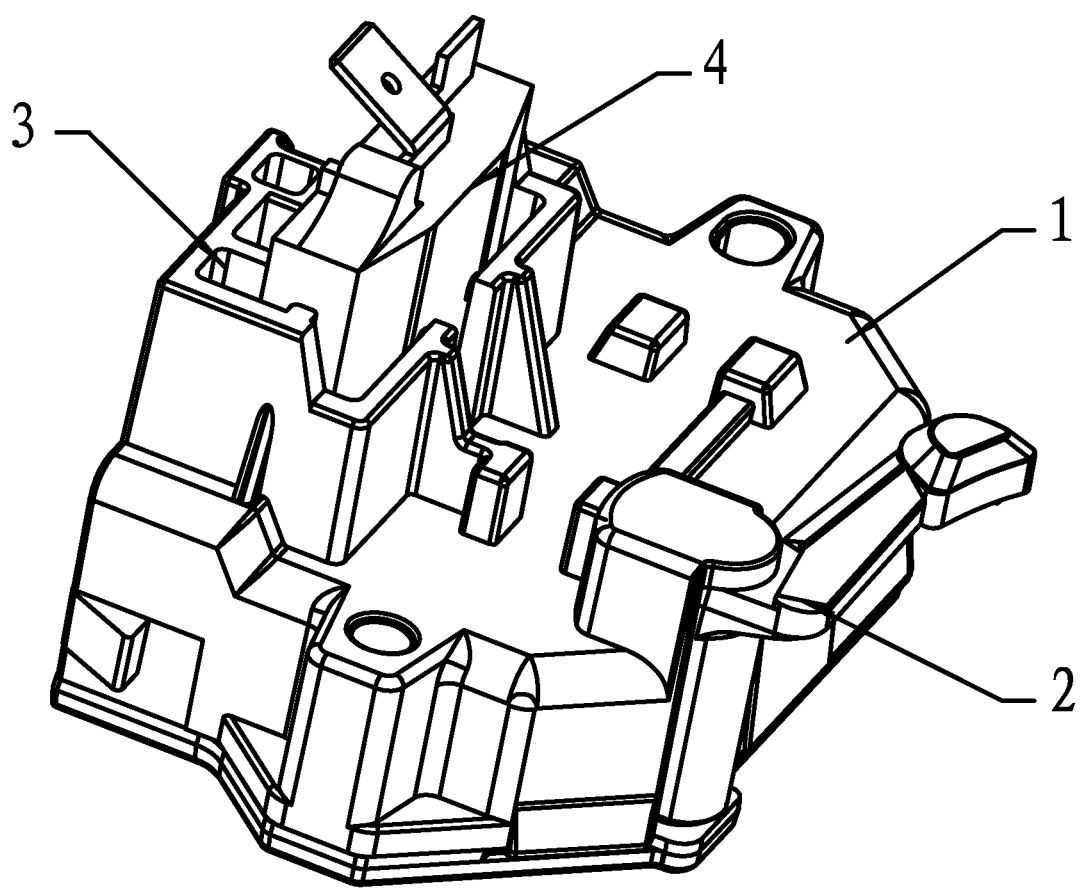
FIG. 1 is a solid diagram of a terminal box of an exemplary embodiment of the invention.
Figure 2:
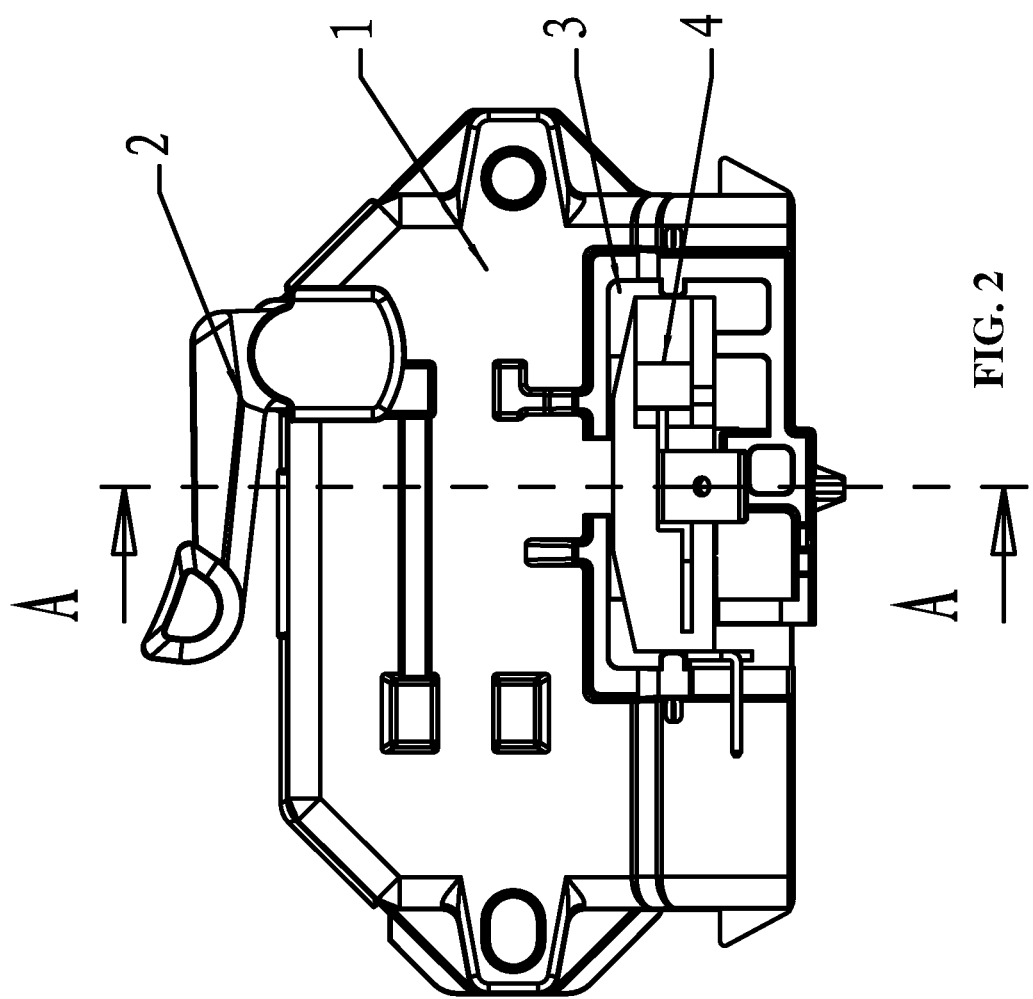
FIG. 2 is a schematic view of FIG. 1.
Figure 3:
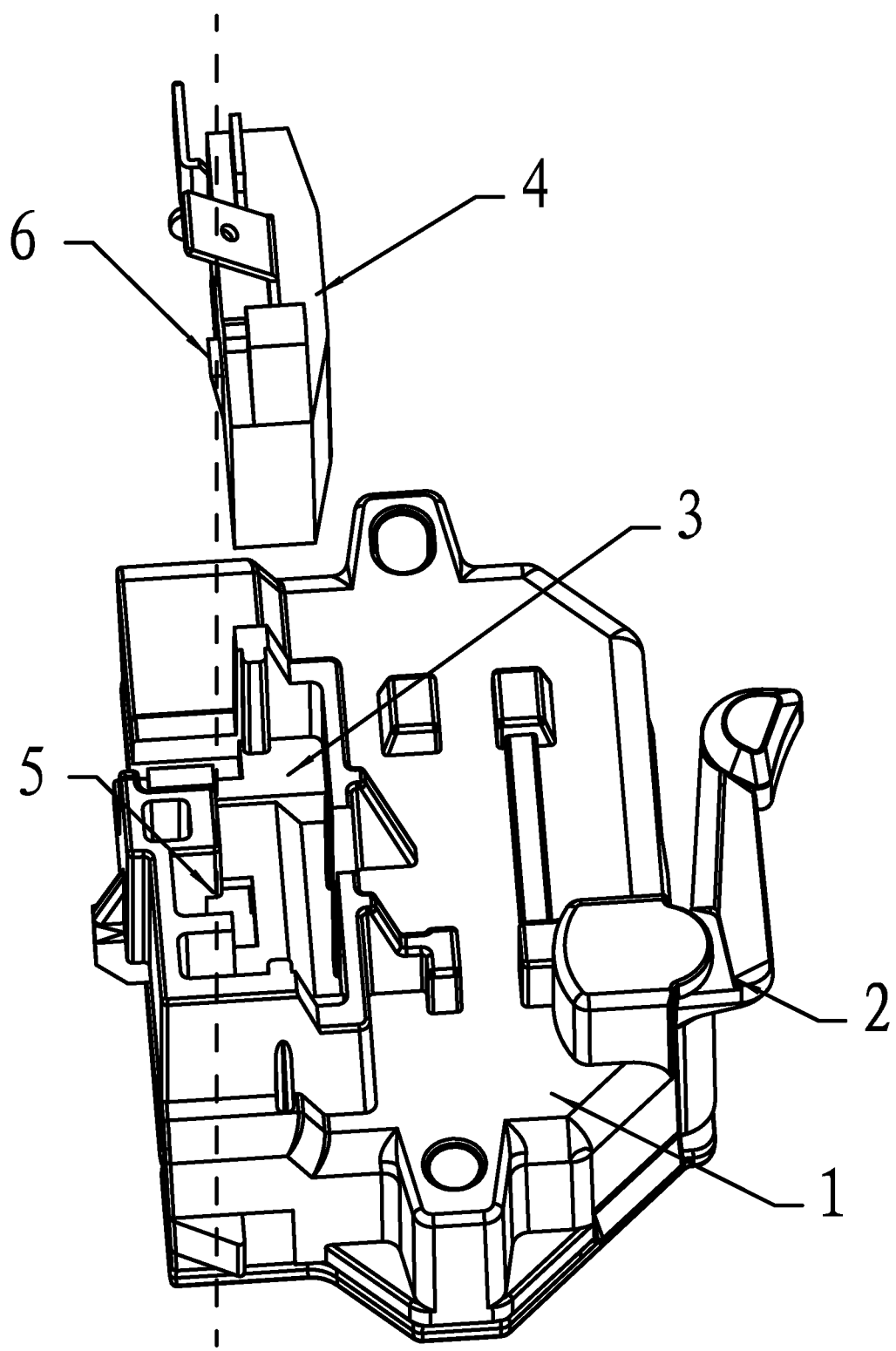
FIG. 3 is an exploded view of a cavity separated from a thermostat.
Figure 4:
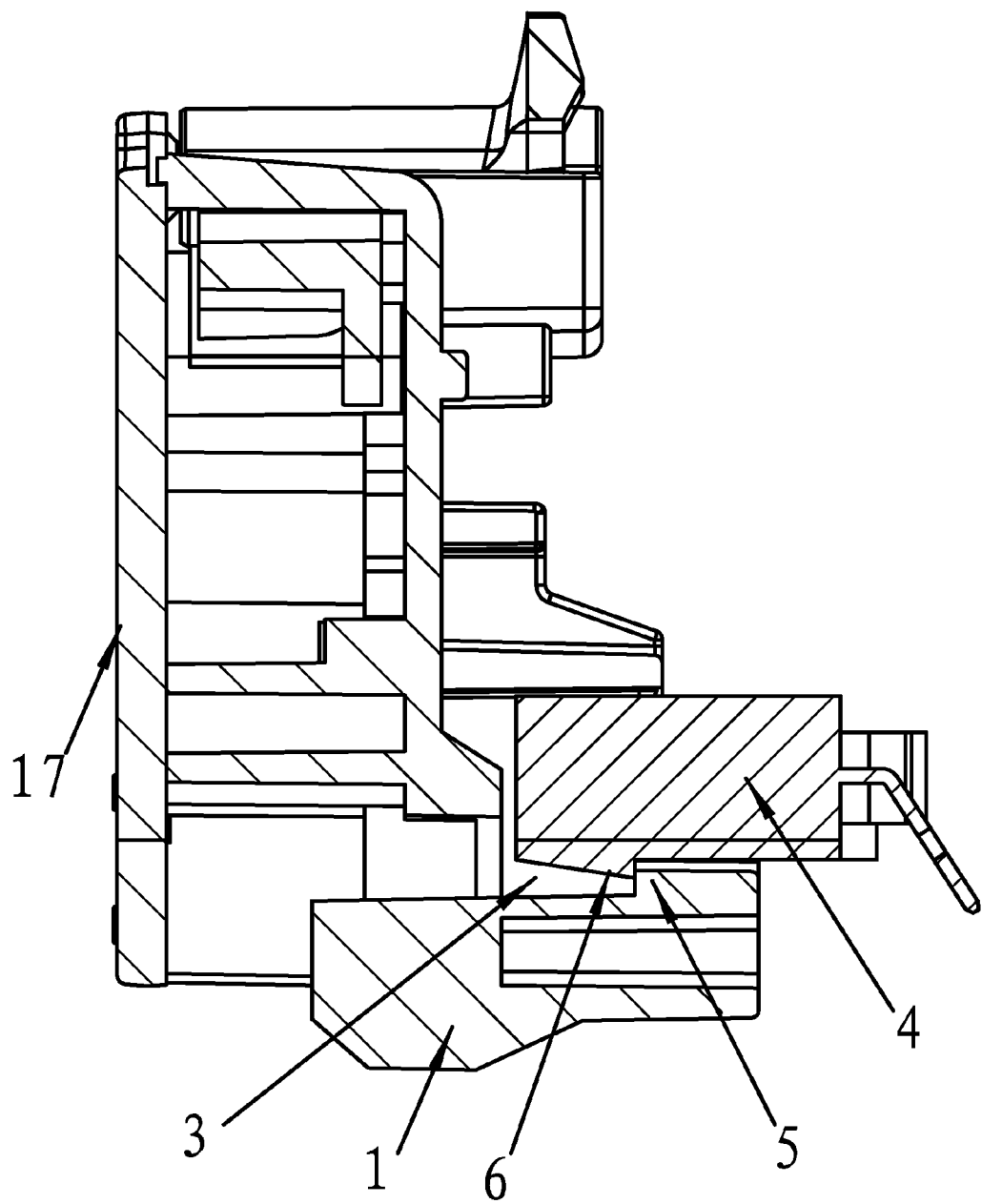
FIG. 4 is a cross-sectional view of FIG. 2 along an A-A line.

Further description of the invention will be given below in conjunction with specific embodiments and accompanying drawings.

As shown in FIGS. 1-4, a terminal box for a centrifugal switch of a motor comprises a housing 1, a bottom cover 17, a movable control rod 2 extending from the housing 1, a cavity 3 disposed on end surface of the housing 1, and a thermostat 4 disposed in the cavity 3. A protruding block 5 is disposed on inner wall of the cavity 3, a reversed hook 6 is disposed on outer side wall of the thermostat 4, and the bottom of the protruding block 5 abuts against the top of the reversed hook 6 whereby fixing the thermostat 4 in the cavity 3.

Figure 5:
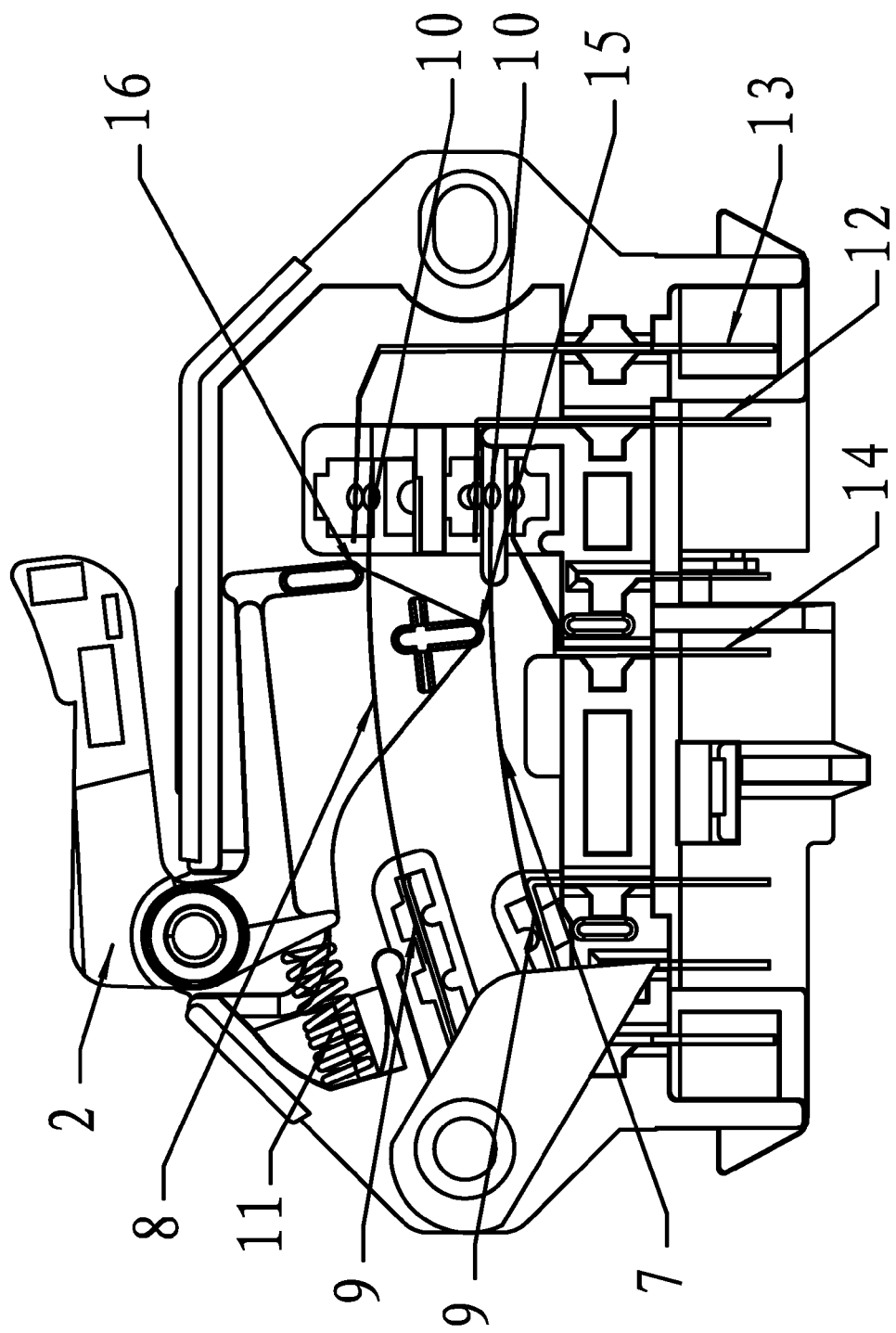
FIG. 5 is an internal structural view of a terminal box without a bottom cover.

As shown in FIGS. 1 and 5, a first movable control plate spring 7, a second movable control plate spring 8, and multiple connecting terminals are disposed in the housing 1. Each of the first movable control plate spring 7 and the second movable control plate spring 8 has a fixed end 9 and a free end 10. As the movable control rod 2 is in a static state, the free end 10 of the first movable control plate spring 7, and the free end 10 of the second movable control plate spring 8 are respectively electrically connected to a first connecting terminal 12 and a second connecting terminal 13. Multiple springs 11 are disposed in the housing 1 and in the vicinity of the movable control rod 2. As the movable control rode 2 moves under the action of external force, the springs 11 elastically supports the movable control rod 2, and the free end 10 of the first movable control plate spring 7 and the free end 10 of the second movable control plate spring 8 respectively bears pushing force from a first pressing part 15 and a second pressing part 16 on the movable control rod 2 and elastically moves. At this time, the free end 10 of the first movable control plate spring 7 is detached from the first connecting terminal 12 and contacted with a third connecting terminal 14 whereby forming electric connection, the free end 10 of the second movable control plate spring 8 is detached from the second connecting terminal 13, and electric connection therebetween is disconnected.

In addition, wall of the cavity 3 and the housing 1 are integrally formed. In other embodiments, the wall of the cavity can be separately formed, and connected to the housing of the terminal box in a manner of individual combination.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A terminal box for a centrifugal switch of a motor, the terminal box comprising:
    a housing having an outer surface;
    a movable control rod;
    a cavity having a protruding block; and
    a thermostat having exactly one reversed hook;
    wherein
    said movable control rod extends from said housing;
    said cavity is disposed on the outer surface of said housing;
    said thermostat is disposed in said cavity;
    said protruding block is disposed on inner wall of said cavity;
    said reversed hook is disposed on outer side wall of said thermostat; and
    the bottom of said protruding block abuts against the top of said reversed hook whereby fixing said thermostat in said cavity.

2. The terminal box of claim 1, wherein a first movable control plate spring, a second movable control plate spring, and multiple connecting terminals are disposed in said housing.

3. The terminal box of claim 2, wherein said first movable control plate spring and said second movable control plate spring are electrically connected to parts of said connecting terminals.

4. The terminal box of claim 3, wherein each of said first movable control plate spring and said second movable control plate spring has a fixed end and a free end.

5. The terminal box of claim 4, wherein
    multiple springs are disposed in said housing and in the vicinity of said movable control rod; and
    as said movable control rode moves under the action of external force, said springs elastically supports said movable control rod, and said free end of said first movable control plate spring and said free end of said second movable control plate spring respectively bears pushing force from a first pressing part and a second pressing part on said movable control rod and elastically moves, and electric connection states of said first movable control plate spring and said second movable control plate spring change.

6. The terminal box of claim 1, wherein wall of said cavity and said housing are integrally formed.

7. In a terminal box for a centrifugal switch of a motor, the terminal box comprising a housing having an outer surface, a cavity being disposed on the outer surface of said housing and having an inner wall, and a thermostat having an outer side wall; the thermostat being inserted into the cavity and the bottom surface of the thermostat being disposed above the bottom surface of the cavity; the improvement comprising a protruding block and exactly one reversed hook; wherein: said protruding block is disposed on said inner wall; said reversed hook is disposed on said outer side wall; and the top surface of said reversed hook directly latches onto the bottom surface of the protruding block, whereby said thermostat is fixed in said cavity.

* * * * *